United States Patent
Lu

(10) Patent No.: US 12,087,163 B2
(45) Date of Patent: Sep. 10, 2024

(54) AUTONOMOUS VEHICLE FLEET ACTING AS A PHASE ARRAY FOR IMAGING AND TOMOGRAPHY

(71) Applicant: GM Cruise Holdings LLC, San Francisco, CA (US)

(72) Inventor: Siyuan Lu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 279 days.

(21) Appl. No.: 17/682,161

(22) Filed: Feb. 28, 2022

(65) Prior Publication Data
US 2023/0274642 A1   Aug. 31, 2023

(51) Int. Cl.
| | | |
|---|---|---|
| G08B 21/00 | (2006.01) |
| G01C 21/00 | (2006.01) |
| G01V 1/16 | (2006.01) |
| G01V 1/34 | (2006.01) |
| G08G 1/13 | (2006.01) |

(52) U.S. Cl.
CPC ........... G08G 1/13 (2013.01); G01C 21/3841 (2020.08); G01V 1/168 (2013.01); G01V 1/34 (2013.01)

(58) Field of Classification Search
CPC .. G08G 1/13; G01C 21/3841; G01C 21/3826; G01C 21/3848; G01V 1/168; G01V 1/34; G01V 1/01; G01V 1/16; G01V 1/003
USPC ......................................................... 340/990
See application file for complete search history.

(56) References Cited

U.S. PATENT DOCUMENTS

| | | | |
|---|---|---|---|
| 2013/0018575 A1 | 1/2013 | Birken et al. | |
| 2018/0224283 A1* | 8/2018 | Fasola ..................... | G01C 21/30 |
| 2019/0146092 A1 | 5/2019 | MacDonald et al. | |
| 2019/0377342 A1* | 12/2019 | Panzica .................... | G08G 1/20 |
| 2020/0109954 A1 | 4/2020 | Li et al. | |
| 2020/0278463 A1* | 9/2020 | Maeki ..................... | G01V 1/168 |
| 2022/0374016 A1* | 11/2022 | Vora ....................... | G05D 1/0231 |

OTHER PUBLICATIONS

Extended European Search Report mailed Jul. 10, 2023, for the corresponding European Patent Application No. 23151290.6.

* cited by examiner

*Primary Examiner* — Mark S Rushing
(74) *Attorney, Agent, or Firm* — Michael DiCato

(57) ABSTRACT

The present disclosure is directed to collecting and processing data from computing devices of a plurality of autonomous vehicles (AVs). The data received from each of these AV computing devices may include raw sensor data or data that has been generated using data received by one or more sensors at respective AVs. Once this data is collected and associated with discrete locations and times, the data may be evaluated and used to generate mappings of various sorts. These mappings may include mappings of underground features generated based on an evaluations of vibration data. Alternatively, or additionally, these mapping may include mappings of landscape features, atmospheric features, or the locations of aircraft from data associated with certain types of sensing apparatus, for example radar apparatus or light detecting and ranging (LiDAR) apparatus.

20 Claims, 4 Drawing Sheets

AUTONOMOUS VEHICLE FLEET ACTING AS A PHASE ARRAY FOR IMAGING AND TOMOGRAPHY

BACKGROUND

1. Technical Field

The present disclosure is generally related to collecting and organizing data from a fleet of autonomous vehicles (AVs). More specifically, the present disclosure is directed to generating mappings from data received from an array of sensing devices distributed over an area.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, radio detection and ranging (radar) sensors, accelerometer (vibration) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The present disclosure is directed to collecting and processing data from computing devices of a plurality of autonomous vehicles (AVs). The data received from each of these AV computing devices may include raw sensor data or data that has been generated using data received by one or more sensors at respective AVs. Once this data is collected and associated with discrete locations and times, the data may be evaluated and used to generate mappings of various sorts. These mappings may include mappings of underground features generated based on an evaluations of vibration data. Alternatively, or additionally, these mapping may include mappings of landscape features, atmospheric features, or the locations of aircraft from data associated with certain types of sensing apparatus, for example radar apparatus or light detecting and ranging (LiDAR) apparatus.

Figure 1:
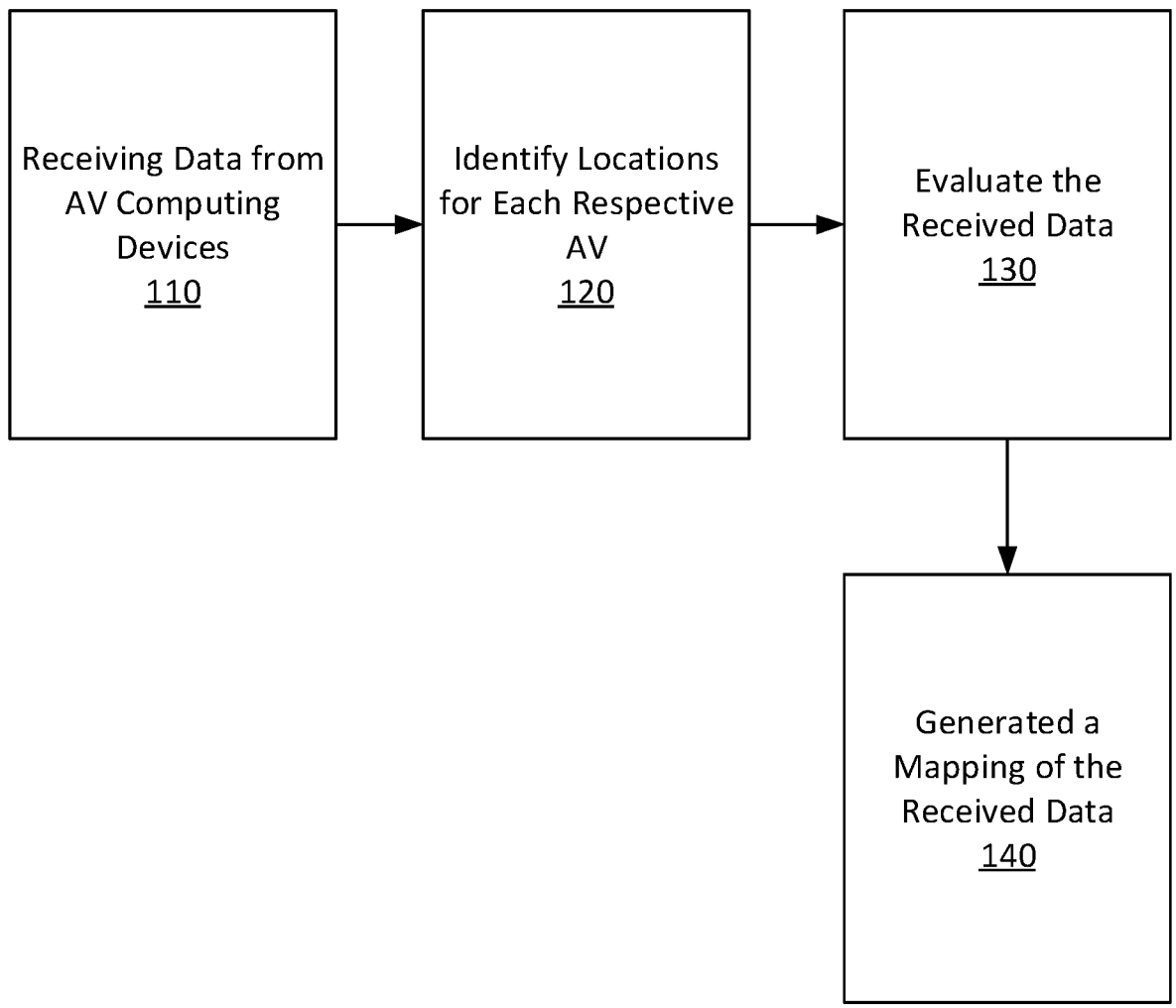
FIG. 1 illustrates a series of steps that may be implemented when data collected from sensing devices of a plurality of autonomous vehicles (AVs) are evaluated.

FIG. 1 illustrates a series of steps that may be implemented when data collected from computing devices of a plurality of autonomous vehicles (AVs) are evaluated. FIG. 1 includes a first step 110 where data is received from sensing devices at a plurality of autonomous vehicles (AVs). The data received from each of these AV computing devices may include raw sensor data or data that has been generated using data received by one or more sensors at respective AVs.

The data received from the computing devices of the AVs in step 110 may be data associated with one or more types of sensors. For example, this data may be associated with radar sensing apparatus, accelerometer or vibration sensors, light detecting and ranging LiDAR sensors, other types of sensors (e.g. radar), or a combination of sensors. The sensing data collected may include phase as well as intensity measurements (e.g. phase and intensity of microwave signal measured by radar or that of a seismic wave measured by vibration sensors.

Figure 2:
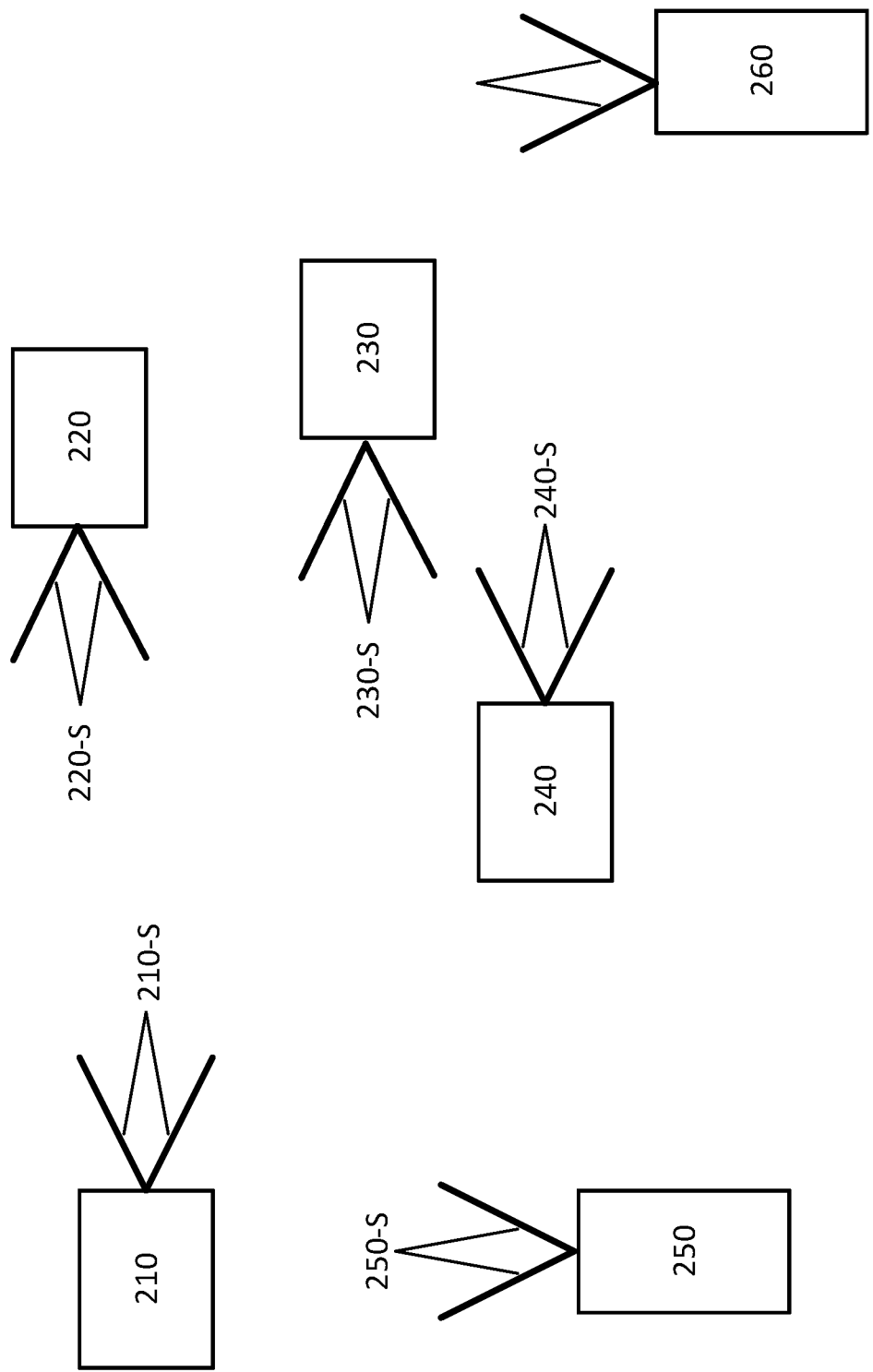
FIG. 2 illustrates a plurality of autonomous vehicles (AVs) distributed over an area that each provide data to a centralized computer.

Next in step 120 of FIG. 2 locations of each respective AV of the plurality of AVs at discrete points in time are identified. Locations of respective AVs may be identified using global positioning (GPS) data, assisted GPS, may be identified based on relative locations of features of a landscape (e.g., a location of a building), or a combination of these techniques. Here computing devices of each respective AV may be aware of its location and the time. Because of this, each AV may be able to associate location data with discrete time data. Sensing apparatus or computing devices of each of the AVs may synchronize timing with each other based on receipt of cellular signals that identify the time, based on use of atomic clocks, or based on other synchronization methods. Respective locations and respective times associated with portions of data received from the AVs may be identified in the data received in step 110 of FIG. 1.

After step 120, the received data may be evaluated in step 130 and a mapping of that data may be generated in step 140 of FIG. 1. The mapping generated in step 140 may be considered a mapping generated based on data collected an array of sensors distributed over an area. For example, data received from AV computing devices in a city may be used to generate mappings of data associated with that city, with ground under the city, or with the air above the city. These arrays of sensors may act as a phased array radar or may act as an array of earthquake (seismic or vibration) sensors.

The data evaluated in step 140 and the mappings generated in step 140 may be used to identify features under the ground, atmospheric conditions, or with mapping landscapes. This data and these mappings may be used to identify areas under the ground where oil or minerals may be found, may be used to identify temperatures and/or humidity of the upper atmosphere above an area, may identify aircraft that flying over an area, or may be used to perform radio astronomy. This approach be applied to seismic tomography, three-dimensional atmospheric data collection, microwave imaging, and producing images based on the receipt of data from global positioning (GPS) satellites.

FIG. 2 illustrates a plurality of autonomous vehicles (AVs) distributed over an area that each provide data to a centralized computer. FIG. 2 includes a plurality of autonomous vehicles (AVs) 210, 220, 230, 240, 250, & 260 that each emit radar signals 210-R, 220-R, 230-R, 240-R, 250-R, & 260-R. As mentioned above, radar apparatus for a phased array radar from which mappings of radar data may be generated.

Each of these vehicles 210-260 may also include seismic sensors, accelerometers, or vibration sensors that sense vibrations in the ground made by earthquakes or other sources. Timing and location data associated with these accelerometer or vibration sensors may be used to identify speeds at which vibrations move through the ground. From this data, pockets or areas under the ground that are associated with changes in the speed of vibrations may be identified. For example, when an earthquake centered at a particular location generates vibrations, those vibrations move though the ground. When the ground includes a same type of material, the speed at which the vibrations moves through the ground is constant. Vibration data, location data, and timing data may be collected and evaluated to identify speeds that the vibrations moved through the ground to respective AV sensing devices. This may include identifying a distance that an AV is from an epicenter of an earthquake and to identify an amount of time that a vibration took to reach an AV. By evaluating data from various different AVs areas where the speed of the vibrations change may be identified. Since vibrations slow down as they move through a liquid, such as oil, a location where oil may be located can be identified based on observed changes in vibration speed. Mappings of features under the ground may be generated and the accuracy of these mappings may be increased by collecting data from more AV sensing devices.

Similarly, each of the vehicle 210-260 may also include microwave sensors which measures the phase of microwave signal from GPS (global positioning system) satellite. The Timing and location tagged GPS signal measurements may be used for atmospheric measurement (temperature and humidity) using GPS-RO (Global positioning system Radio Occultation) method. For example, when GPS-RO signal passes through a volume of atmosphere of low temperature or high humidity which results in high refractive index for the atmosphere, the phase of the GPS signal will be slightly delayed. The phase delay can be used inversely to resolve the atmospheric temperature or humidity. By evaluating data from a large number of AVs distributed over a large area, a 3-dimensional mapping of atmosphere condition may be generated. A GPS-RO signal may be referred to as a GPS microwave signal as these signals are in the microwave range and positioning data associated with a GPS-RO signal may be referred to as GPS microwave data.

Figure 3:
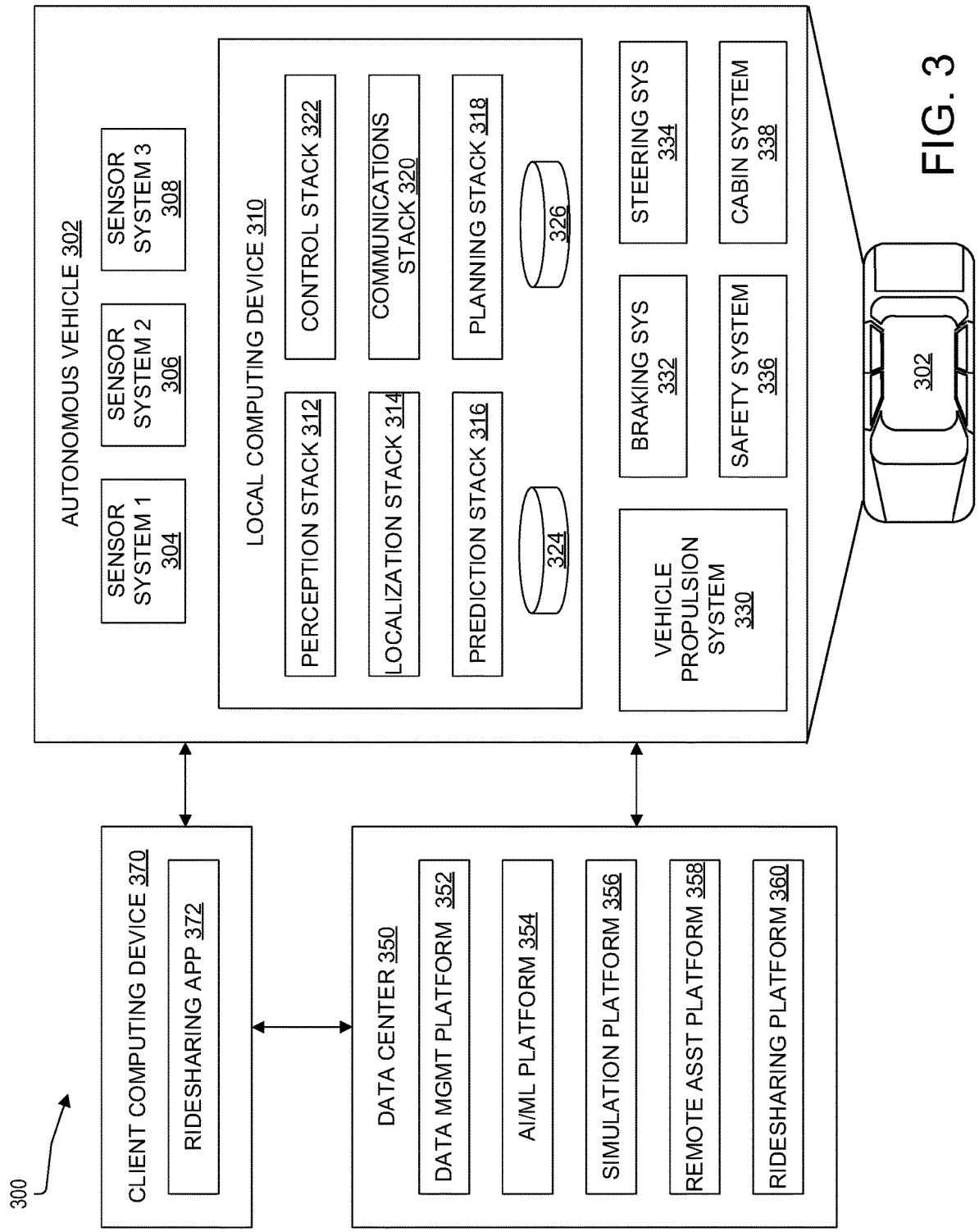
FIG. 3 illustrates an example of a system for managing one or more autonomous vehicles (AVs) in accordance with some aspects of the present technology.

FIG. 3 illustrates an example of an AV management system 300. One of ordinary skill in the art will understand that, for the AV management system 300 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

If you train both of these tasks jointly, they can help each other add multiple tasks to a neural network specific to the task you are trying to solve can improve overall performance. Do multiple things and be used in multiple ways down-stream and improve training via multi-task learning framework.

In this example, the AV management system 300 includes an AV 302, a data center 350, and a client computing device 370. The AV 302, the data center 350, and the client computing device 370 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 302 can navigate roadways without a human driver based on sensor signals generated by multiple sensor systems 304, 306, and 308. The sensor systems 304-308 can include different types of sensors and can be arranged about the AV 302. For instance, the sensor systems 304-308 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 304 can be a camera system, the sensor system 306 can be a LIDAR system, and the sensor system 308 can be a RADAR system. Other embodiments may include any other number and type of sensors.

The AV 302 can also include several mechanical systems that can be used to maneuver or operate the AV 302. For instance, the mechanical systems can include a vehicle propulsion system 330, a braking system 332, a steering system 334, a safety system 336, and a cabin system 338, among other systems. The vehicle propulsion system 330 can include an electric motor, an internal combustion engine, or both. The braking system 332 can include an engine brake, brake pads, actuators, and/or any other suitable componentry configured to assist in decelerating the AV 302. The steering system 334 can include suitable componentry configured to control the direction of movement of the AV 302 during navigation. The safety system 336 can include lights and signal indicators, a parking brake, airbags, and so forth. The cabin system 338 can include cabin temperature control systems, in-cabin entertainment systems, and so forth. In some embodiments, the AV 302 might not include human driver actuators (e.g., steering wheel, handbrake, foot brake pedal, foot accelerator pedal, turn signal lever, window wipers, etc.) for controlling the AV 302. Instead, the cabin system 338 can include one or more client interfaces (e.g., Graphical User Interfaces (GUIs), Voice User Interfaces (VUIs), etc.) for controlling certain aspects of the mechanical systems 330-338.

The AV 302 can additionally include a local computing device 310 that is in communication with the sensor systems 304-308, the mechanical systems 330-338, the data center 350, and the client computing device 370, among other systems. The local computing device 310 can include one or more processors and memory, including instructions that can be executed by the one or more processors. The instructions can make up one or more software stacks or components responsible for controlling the AV 302; communicating with the data center 350, the client computing device 370, and other systems; receiving inputs from riders, passengers, and other entities within the AV's environment; logging metrics collected by the sensor systems 304-308; and so forth. In this example, the local computing device 310 includes a perception stack 312, a mapping and localization stack 314, a prediction stack 316, a planning stack 318, a communications stack 320, a control stack 322, an AV operational database 324, and an HD geospatial database 326, among other stacks and systems.

The perception stack 312 can enable the AV 302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 304-308, the mapping and localization stack 314, the HD geospatial database 326, other components of the AV, and other data sources (e.g., the data center 350, the client computing device 370, third party data sources, etc.). The perception stack 312 can detect and classify objects and determine their current locations, speeds, directions, and the like. In addition, the perception stack 312 can determine the free space around the AV 302 (e.g., to maintain a safe distance from other objects, change lanes, park the AV, etc.). The perception stack 312 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 314 can determine the AV's position and orientation (pose) using different methods from multiple systems (e.g., GPS, IMUs, cameras, LIDAR, RADAR, ultrasonic sensors, the HD geospatial database 322, etc.). For example, in some embodiments, the AV 302 can compare sensor data captured in real-time by the sensor systems 304-308 to data in the HD geospatial database 326 to determine its precise (e.g., accurate to the order of a few centimeters or less) position and orientation. The AV 302 can focus its search based on sensor data from one or more first sensor systems (e.g., GPS) by matching sensor data from one or more second sensor systems (e.g., LIDAR). If the mapping and localization information from one system is unavailable, the AV 302 can use mapping and localization information from a redundant system and/or from remote data sources.

The prediction stack 316 can receive information from the localization stack 314 and objects identified by the perception stack 312 and predict a future path for the objects. In some embodiments, the prediction stack 316 can output several likely paths that an object is predicted to take along with a probability associated with each path. For each predicted path, the prediction stack 316 can also output a range of points along the path corresponding to a predicted location of the object along the path at future time intervals along with an expected error value for each of the points that indicates a probabilistic deviation from that point.

The planning stack 318 can determine how to maneuver or operate the AV 302 safely and efficiently in its environment. For example, the planning stack 316 can receive the location, speed, and direction of the AV 302, geospatial data, data regarding objects sharing the road with the AV 302 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 302 from one point to another and outputs from the perception stack 312, localization stack 314, and prediction stack 316. The planning stack 318 can determine multiple sets of one or more mechanical operations that the AV 302 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 318 can select from multiple backup plans to carry out. For example, while preparing to change lanes to turn right at an intersection, another vehicle may aggressively cut into the destination lane, making the lane change unsafe. The planning stack 318 could have already determined an alternative plan for such an event. Upon its occurrence, it could help direct the AV 302 to go around the block instead of blocking a current lane while waiting for an opening to change lanes.

The control stack 322 can manage the operation of the vehicle propulsion system 330, the braking system 332, the steering system 334, the safety system 336, and the cabin system 338. The control stack 322 can receive sensor signals from the sensor systems 304-308 as well as communicate with other stacks or components of the local computing device 310 or a remote system (e.g., the data center 350) to effectuate operation of the AV 302. For example, the control stack 322 can implement the final path or actions from the multiple paths or actions provided by the planning stack 318. This can involve turning the routes and decisions from the planning stack 318 into commands for the actuators that control the AV's steering, throttle, brake, and drive unit.

The communication stack 320 can transmit and receive signals between the various stacks and other components of the AV 302 and between the AV 302, the data center 350, the client computing device 370, and other remote systems. The communication stack 320 can enable the local computing device 310 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 320 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 326 can store HD maps and related data of the streets upon which the AV 302 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 324 can store raw AV data generated by the sensor systems 304-308, stacks 312-322, and other components of the AV 302 and/or data received by the AV 302 from remote systems (e.g., the data center 350, the client computing device 370, etc.). In some embodiments, the raw AV data can include HD LIDAR point cloud data, image data, RADAR data, GPS data, and other sensor data that the data center 350 can use for creating or updating AV geospatial data or for creating simulations of situations encountered by AV 302 for future testing or training of various machine learning algorithms that are incorporated in the local computing device 310.

The data center 350 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 350 can include one or more computing devices remote to the local computing device 310 for managing a fleet of AVs and AV-related services. For example, in addition to managing the AV 302, the data center 350 may also support a ridesharing service, a delivery service, a remote/roadside assistance service, street services (e.g., street mapping, street patrol, street cleaning, street metering, parking reservation, etc.), and the like.

The data center 350 can send and receive various signals to and from the AV 302 and the client computing device 370. These signals can include sensor data captured by the sensor systems 304-308, roadside assistance requests, software updates, ridesharing pick-up and drop-off instructions, and so forth. In this example, the data center 350 includes a data management platform 352, an Artificial Intelligence/Machine Learning (AI/ML) platform 354, a simulation platform 356, a remote assistance platform 358, and a ridesharing platform 360, among other systems.

The data management platform 352 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 350 can access data stored by the data management platform 352 to provide their respective services.

The AI/ML platform 354 can provide the infrastructure for training and evaluating machine learning algorithms for operating the AV 302, the simulation platform 356, the remote assistance platform 358, the ridesharing platform 360, the cartography platform 362, and other platforms and systems. Using the AI/ML platform 354, data scientists can prepare data sets from the data management platform 352; select, design, and train machine learning models; evaluate, refine, and deploy the models; maintain, monitor, and retrain the models; and so on.

The simulation platform 356 can enable testing and validation of the algorithms, machine learning models, neural networks, and other development efforts for the AV 302, the remote assistance platform 358, the ridesharing platform 360, the cartography platform 362, and other platforms and systems. The simulation platform 356 can replicate a variety of driving environments and/or reproduce real-world scenarios from data captured by the AV 302, including rendering geospatial information and road infrastructure (e.g., streets, lanes, crosswalks, traffic lights, stop signs, etc.) obtained from the cartography platform 362; modeling the behavior of other vehicles, bicycles, pedestrians, and other dynamic elements; simulating inclement weather conditions, different traffic scenarios; and so on.

The remote assistance platform 358 can generate and transmit instructions regarding the operation of the AV 302. For example, in response to an output of the AI/ML platform 354 or other system of the data center 350, the remote assistance platform 358 can prepare instructions for one or more stacks or other components of the AV 302.

The ridesharing platform 360 can interact with a customer of a ridesharing service via a ridesharing application 372 executing on the client computing device 370. The client computing device 370 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 372. The client computing device 370 can be a customer's mobile computing device or a computing device integrated with the AV 302 (e.g., the local computing device 310). The ridesharing platform 360 can receive requests to pick up or drop off from the ridesharing application 372 and dispatch the AV 302 for the trip.

Figure 4:
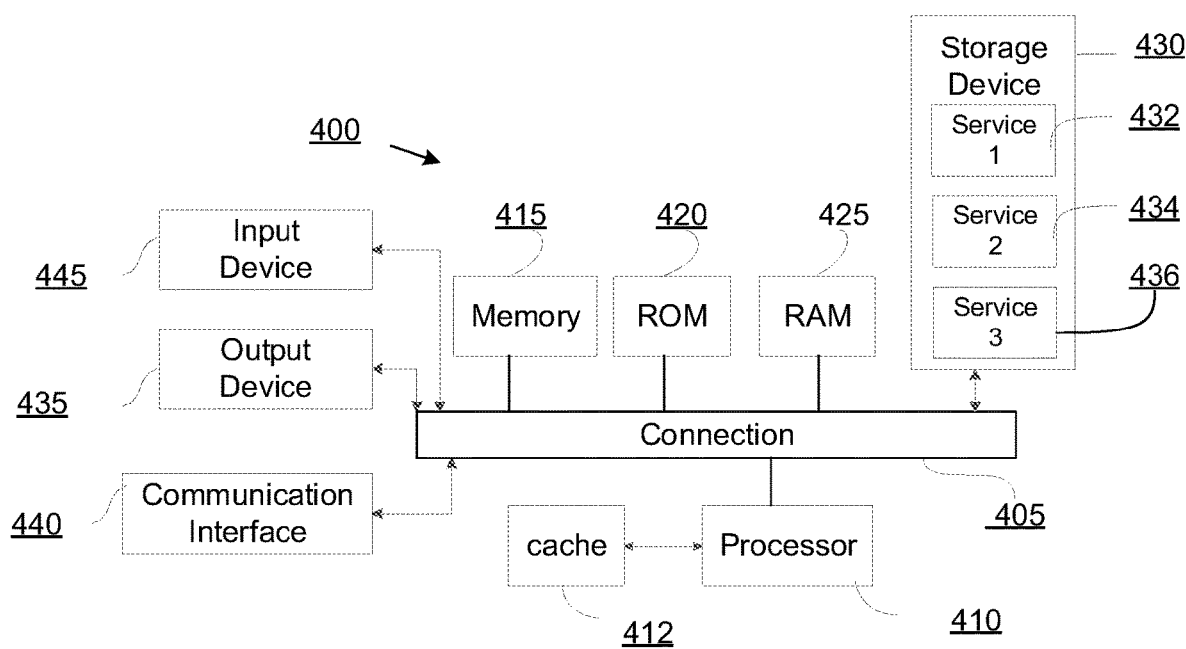
FIG. 4 shows an example of computing system that may be used to implement at least some of the functions reviewed in the present disclosure in accordance with some aspects of the present technology.

FIG. 4 shows an example of computing system 400 that may be used to implement at least some of the functions reviewed in the present disclosure. In certain instances, a computing device may be incorporated into a sensing apparatus or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 442, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for collecting sensor data, the method comprising:
   receiving data from computing devices at a plurality of autonomous vehicles (AVs), wherein a portion of the received data corresponds to vibration data;
   identifying locations for each respective AV of the plurality of AVs at discrete points in time;

evaluating the data received from the computing devices to identify features below ground that the AVs are operating on based on the evaluation of the vibration data, wherein the identified features include determining whether at least two pockets of material below the ground are of different types based on a first AV in the plurality of AVs at a first location detecting a first speed of vibration of a wave moving through the ground and a second AV in the plurality of AVs at a second location detecting a second speed of vibration of the wave moving through the ground, wherein the at least two pockets of material below the ground are identified as different types of material when the first speed and the second speed are not equal; and generating a mapping of the received data, the mapping associated with the identified locations for each of the respective AVs at the discrete points in time.

2. The method of claim 1, further comprising associating the plurality of AVs with a region, wherein the generated mapping corresponds to the region.

3. The method of claim 1, wherein the sensing data include phase and intensity of the wave.

4. The method of claim 3, wherein when the first speed is less than the second speed, a first pocket of material in the at least two pockets of material is identified as a liquid.

5. The method of claim 1, wherein a portion of the received data corresponds to global positioning (GPS) microwave data.

6. The method of claim 5, further comprising identifying an atmospheric condition based on the evaluation of the portion of the received data.

7. The method of claim 5, further comprising identifying an object based on the evaluation of the portion of the received data.

8. A non-transitory computer-readable storage medium having embodied thereon a program executable by a processor to implement a method for collecting sensor data, the method comprising:

receiving data from computing devices at a plurality of autonomous vehicles (AVs), wherein a portion of the received data corresponds to vibration data;

identifying locations for each respective AV of the plurality of AVs at discrete points in time;

evaluating the data received from the computing devices to identify features below ground that the AVs are operating on based on the evaluation of the vibration data, wherein the identified features include determining whether at least two pockets of material below the ground are of different types based on a first AV in the plurality of AVs at a first location detecting a first speed of vibration of a wave moving through the ground and a second AV in the plurality of AVs at a second location detecting a second speed of vibration of the wave moving through the ground, wherein the at least two pockets of material below the ground are identified as different types of material when the first speed and the second speed are not equal; and generating a mapping of the received data, the mapping associated with the identified locations for each of the respective AVs at the discrete points in time.

9. The non-transitory computer-readable storage medium of claim 8, the program further executable to associate the plurality of AVs with a region, wherein the generated mapping corresponds to the region.

10. The non-transitory computer-readable storage medium of claim 8, wherein the sensing data include phase and intensity of the wave.

11. The non-transitory computer-readable storage medium of claim 10, wherein when the first speed is less than the second speed, a first pocket of material in the at least two pockets of material is identified as a liquid.

12. The non-transitory computer-readable storage medium of claim 8, wherein a portion of the received data corresponds to GPS microwave data.

13. The non-transitory computer-readable storage medium of claim 12, the program further executable to identify an atmospheric condition based on the evaluation of the portion of the received data.

14. The non-transitory computer-readable storage medium of claim 12, the program further executable to identify an object based on the evaluation of the portion of the received data.

15. A system for collecting sensor data, the system comprising:

a plurality of autonomous vehicles (AVs) that collect sensor data and that include a respective computing device, wherein a portion of the received data corresponds to vibration data; and a computer that receives data associated with the sensor data from each of the respective computing devices of the plurality of AVs, wherein the computer:

identifies locations for each respective AV of the plurality of AVs at discrete points in time;

evaluates the data received from the respective computing devices to identify features below ground that the AVs are operating on based on the evaluation of the vibration data, wherein the identified features include determining whether at least two pockets of material below the ground are of different types based on a first AV in the plurality of AVs at a first location detecting a first speed of vibration of a wave moving through the ground and a second AV in the plurality of AVs at a second location detecting a second speed of vibration of the wave moving through the ground, wherein the at least two pockets of material below the ground are identified as different types of material when the first speed and the second speed are not equal; and generates a mapping of the received data, the mapping associated with the identified locations for each of the respective AVs at the discrete points in time.

16. The system of claim 15, wherein the computer associates the plurality of AVs with a region, wherein the generated mapping corresponds to the region.

17. The system of claim 15, wherein the sensing data include phase and intensity of the wave.

18. The system of claim 17, wherein when the first speed is less than the second speed, a first pocket of material in the at least two pockets of material is identified as a liquid.

19. The system of claim 15, wherein a portion of the received data corresponds to global positioning (GPS) microwave data.

20. The system of claim 19, wherein the computer identifies an atmospheric condition based on the evaluation of the portion of the received data.

* * * * *